Feb. 15, 1966 J. W. HEBB ETAL 3,235,195

TRANSPORT FOR AN ENDLESS TAPE COIL

Filed Nov. 1, 1961 3 Sheets-Sheet 1

JAMES W. HEBB &
AKIYOSHI IWATA
INVENTORS

BY Robert G. Clay

ATTORNEY

Feb. 15, 1966 J. W. HEBB ETAL 3,235,195

TRANSPORT FOR AN ENDLESS TAPE COIL

Filed Nov. 1, 1961 3 Sheets-Sheet 2

JAMES W. HEBB &
AKIYOSHI IWATA
INVENTORS

BY Robert G. Clay

ATTORNEY

TRANSPORT FOR AN ENDLESS TAPE COIL

Filed Nov. 1, 1961 3 Sheets-Sheet 3

JAMES W. HEBB &
AKIYOSHI IWATA
INVENTORS

BY Robert S. Clay

ATTORNEY 3,235,195

TRANSPORT FOR AN ENDLESS TAPE COIL

James W. Hebb, Redwood City, and Akiyoshi Iwata, San Carlos, Calif., assignors to Ampex Corporation, Redwood City, Calif., a corporation of California Filed Nov. 1, 1961, Ser. No. 149,316
5 Claims. (Cl. 242—55.19)

This invention relates to magnetic tape transports, and particularly to such transports for use with endless tape coils.

Endless tape transports, particularly for use in rockets and earth-orbiting satellites, should be arranged compactly, and the most efficient use made of available space. The central zone within the compass of the coil may be used to this end for mounting transducers, capstans and other components of the system. But with such an arrangement the problem arises of how to provide for rotation of the coil. If the coil is thick, then it cannot be rotated merely by the pull imparted thereto by the tape-driving capstan acting on the tape, because the strain on the tape would be too great. To mount the coil on a rotating table or disc will not do, because the centralized mounting of the rotating table would interfere with the centralized positioning of the above-mentioned fixed components.

Also in transports adapted for use in space, the problem arises of how to cause the capstan and pinch roller to initiate operation properly after long periods of inoperation. To economize on parts, it is desirable to leave the pinch mechanisms continuously engaged even when the capstan is inoperative. With the rubber-coated pinch rollers previously known, static engagement would cause a flat to set on the engaged side of the roller, with the result that on starting the roller would be out-of-round.

Accordingly, it is an object of this invention to provide an endless tape transport in which the tape coming from the coil is maintained at a predetermined low tension by means that leaves the interior zone of the coil free for the mounting of other components.

It is another object of this invention to provide an endless tape transport in which the tape coil is rotated by means separate from the tape driving capstan and yet coordinated therewith to maintain a predetermined tension in the tape, the rotating means being arranged to leave maximum free space in the zone enclosed by the coil for mounting of other components.

It is a further object of this invention to provide a tape transport suitable for use in a rocket or an earth-orbiting satellite and providing substantially friction-free and inertia-free feeding of said tape under the influence of very high gravitational and accelerating forces, the transport being arranged in a space-saving configuration and being formed of a minimum number of light-weight parts.

It is still a further object of this invention to provide a tape transport suitable for instant operation after long periods of inactivity, and needing no tape engaging or disengaging action or structure therefor.

A transport in accordance with the invention makes use of an endless tape coil mounted for rotation on fixed anti-friction bearings and supported thereby at the inner periphery of the coil and at least one side of the coil. The transducers and a closed-loop capstan assembly are mounted on the interior of the coil within the zone defined by the bearing means. The coil is rotated by an endless belt having an outer loop carried by the bearing means and engaging the inner periphery of the coil; and the belt has a re-entrant inner loop that surrounds and avoids the transducers and the tape-driving capstan. The belt is moved by a belt capstan, the operation of which is controlled by a tape-tension sensing arm so that the belt and coil are continuously moved at metering rate of the tape capstan. Thus the tension in the tape is maintained at a predetermined value and no undue strain results. A third capstan is used to replace tape in a loose loop on the outer periphery of the coil, and the tape capstan assembly is arranged to provide resilient pinching and driving of the tape instantly, even after many years of inoperation, as by including a nonresilient belt for pinching the tape against the capstan, the belt being continuously engaged.

The invention will be described in greater detail together with the accompanying drawings, in which.

Figure 1:
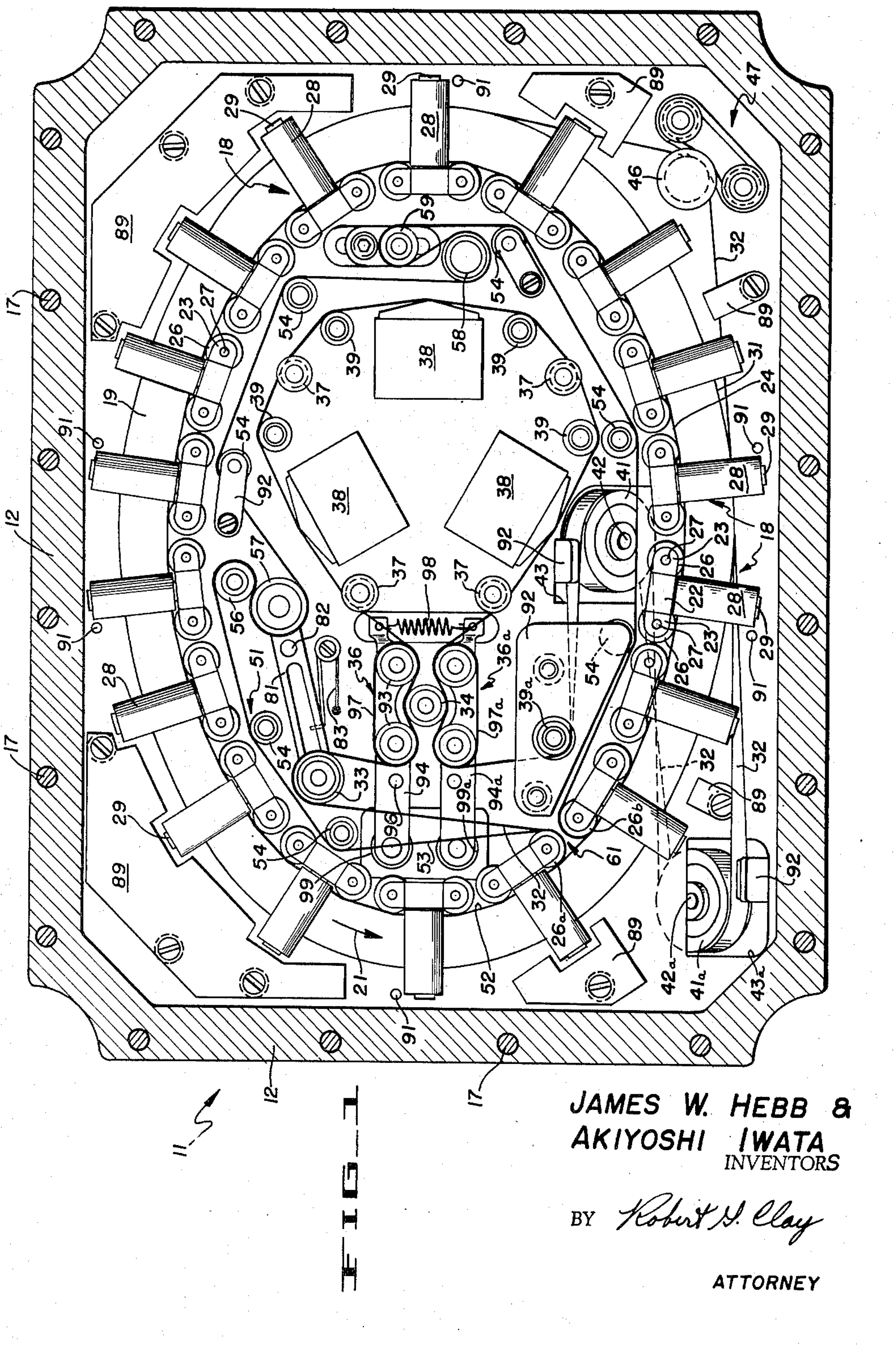
FIGURE 1 is a plan view of a transport constructed in accordance with the invention.
Figure 2:
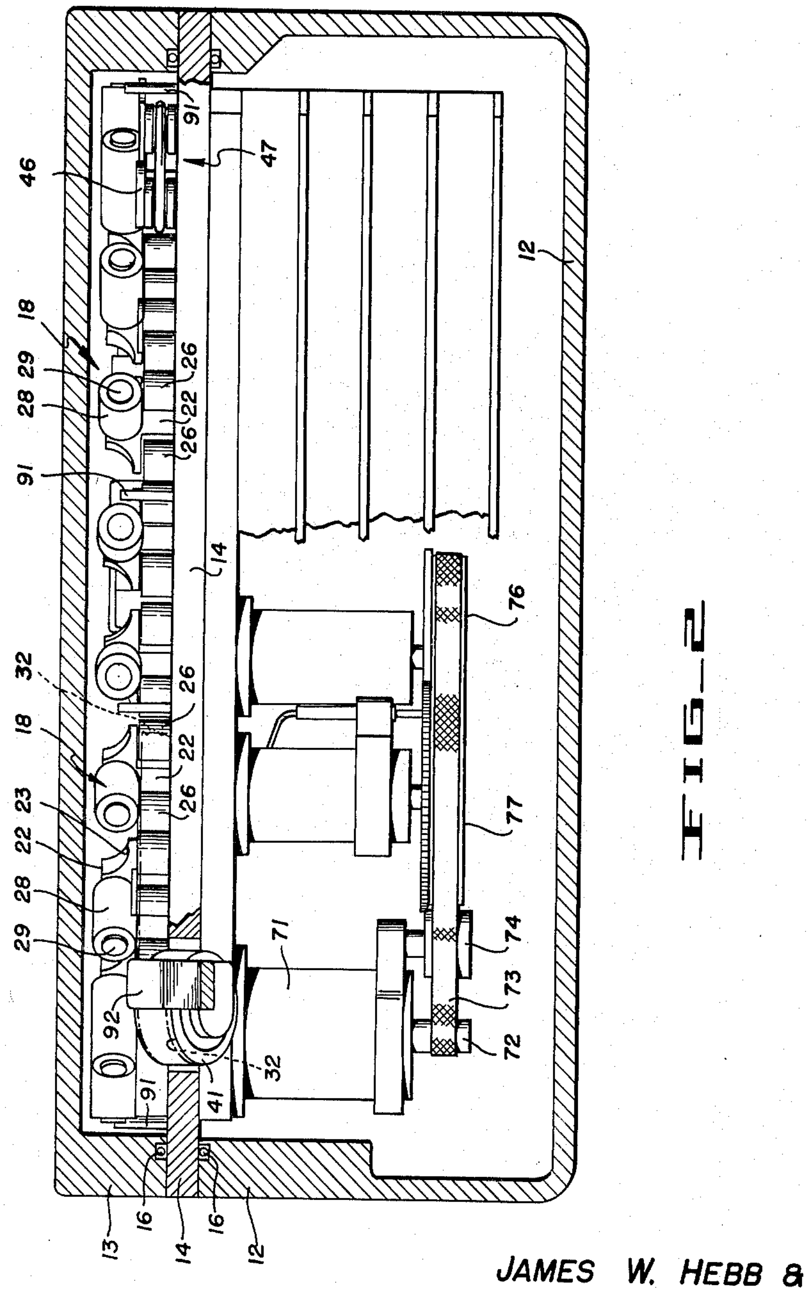
FIGURE 2 is a broken away elevation view of the apparatus shown in FIGURE 1.

Referring now to FIGURES 1 and 2, there is shown a tape transport 11 enclosed in a housing 12. The housing 12 includes cover portion 13 that is shown only in FIGURE 2, and between the main portion of the housing 12 and the cover plate 13 is mounted a top plate 14, the joint being sealed as by means of O-ring type seals 16 mounted in appropriate recesses in the housing and cover plate. The cover plate is removably secured to the main portion of the housing as by means of bolts 17.

On the upper face of the top plate 14 are mounted a number of anti-friction bearing elements 18 for supporting and guiding an endless tape coil 19 for substantially frictionless rotation of the coil, the rotation being here shown (FIGURE 1) as in a counter-clockwise direction indicated by arrow 21. Each of the bearing elements 18 is constructed to include a generally T-shape mounting bracket 22 having a pair of arms 23 extending generally tangentially to the inner periphery 24 of the coil and in spaced relation to the top plate 14. Between each arm and the top plate is mounted a roller bearing 26 arranged for axial rotation on a pin 27. These roller bearings 26 are the elements that support and guide the inner periphery of the coil. To support the flat face or side of the coil, an elongated roller bearing 28 is mounted on an axial pin 29 extending from the head portion of the T-shaped bracket 22 and transversely across the thickness of the coil.

It will be understood that the transport is constructed in the particular embodiment illustrated for use in a rocket or in an earth-orbiting satellite in which the major accelerating and decelerating forces are expected to operate in a direction perpendicular to the general plane of the coil 19. In some such uses, there may be no need for supporting the coil against accelerating forces directed for example upwardly away from the plane of the coil as illustrated in FIGURE 1, but only against forces acting downwardly toward that plane. In other uses, it may be necessary to additionally support the coil against forces acting upwardly from the coil plane; and in such instances, an additional array of rollers 28 may be mounted on the opposite flat face of the coil 19.

Means are provided for guiding tape from the inner periphery 24 of the coil and out of the plane of the coil to the outer periphery 31 of the coil. For simplicity these means are more clearly shown in FIGURE 3. The tape portion 32 leaving the inner periphery of the coil passes first around a particular roller 26*a*, thence around a roller 33 having a particular function later to be described, thence between a capstan 34 and pinch device 36, thence around a fixed guide post 37, a transducing head 38, a rotating guide 39, a post 37, a guide 39, a head 38, a guide 39, a post 37, a guide 39, a head 38, a post 37, and back between the capstan 34 and a second pinch device 36*a*, completing a closed tape loop around the heads 38. From the pinch device 36*a*, the tape portion 32 passes around another roller 39*a* and is twisted to meet the outer peripheral face of a larger diameter roller 41 that is mounted on an axial pin 42 inclined at an angle to the plane of the top plate 14. The roller 41 is particularly mounted in an opening 43 in the top plate in such a manner that half of the periphery lies above the upper surface of the top plate and the other half of the periphery lies below the lower half of the top plate. Thus the tape portion 32 in passage around the roller 41 is carried out of the plane of the tape and to a portion below the lower flat face of the tape coil 19. From the roller 41 the tape passes below the coil and to a portion beyond the outer periphery 31 of the coil, twisting in its course to meet the peripheral surface of a second large roller 41*a*. The roller 41*a* is also mounted on a pin 42*a* at an opposite angle to the plane of the top plate and similarly extends through an opening 43*a* so as to pass the tape upwardly through the top plate for return to the outer periphery 31 of the coil. From the roller 41*a*, the tape portion 32 passes to an auxiliary capstan 46 and between that capstan and a pinch device 47 and back to the outer periphery 31 of the tape coil.

It will be understood that the tape in the coil 19 has considerable mass, and that in slipping from the outer to the inner periphery during rotation there is considerable friction between the various layers of tape. If the coil were rotated by the action of the capstan 34 alone, there would be an undesirable amount of strain in the single portion of tape 32 between the capstan and the roller 26*a*. Therefore, means are provided for driving the tape coil 19 in rotation in such a way as not to impose more than a predetermined value of tension in the tape portion 32. This means is arranged to drive the tape coil 19 independently of the capstan 34 but at precisely the same inner peripheral velocity as the peripheral velocity of the capstan 34.

The coil driving means is here shown as including an endless belt 51, having an outer loop 52 mounted generally between the inner periphery 24 of the coil and the roller bearings 26. The belt also has a re-entrant loop 53 that is arranged to be encircled by the array of bearing elements 18 and to in turn encircle all of the centrally mounted tape guiding elements and capstan and transducing means 33–41. In particular, the inner loop 53 of the belt comes inwardly around the bearing roller 26*a* between the roller and the tape portion 32, and is then conducted on a path diverging from the tape portion 32 and around a pair of guide rollers 54, around a belt driving capstan 56, reversely around a belt pinch roller 57, around a pair of guide rollers 54, around a rotating drum 58 that is used to drive the auxiliary capstan 46, around a slidably mounted guide roller 59 that is used to tension the belt 51, around three further guide rollers 54 and back around a bearing roller 26*b* to re-engage the inner periphery 24 of the tape coil. The bearing rollers 26*a* and 26*b* are adjacent to one another but are mounted on different brackets 22 so as to leave a passage 61 for the tape 32 and the two shanks of the inner loop 53 of the belt.

Figure 3:
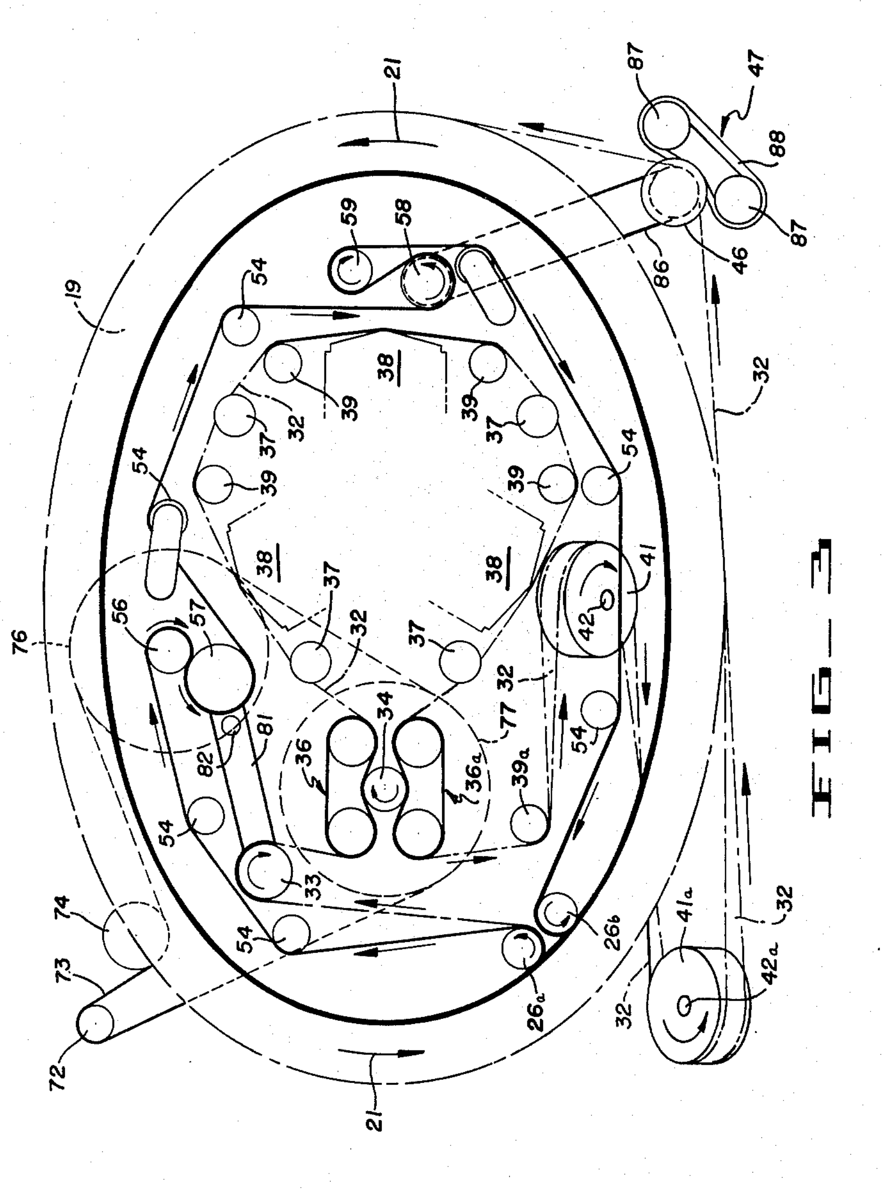
FIGURE 3 is a schematic view of a portion of the apparatus illustrated in FIGURES 1 and 2.

As shown in FIGURES 2 and 3, the drive for the tape capstan 34 and the belt capstan 56 is taken from a drive motor 71 mounted on the underside of the top plate 14 and having a drive shaft 72, around which is looped a drive belt 73. The belt 73 passes around a tensioning idler 74, a fly-wheel 76 associated with the belt capstan 56, a fly-wheel 77 associated with a tape capstan 34, and back to the motor drive shaft 72. The belt capstan fly-wheel 76 is substantially smaller in diameter than the tape capstan fly-wheel 77, with the result that the belt capstan 56, which has the same diameter as the tape capstan 34, is driven at a greater rotational velocity and peripheral speed. The reason for this arrangement is to establish a condition permitting frictional-slippage control of the speed of the belt 51 so that it may be regulated to travel at precisely the same speed as the portion 32 of the tape. It will be noted that the roller 33 and the belt pinch roller 57 are mounted at opposite ends of an arm 81 that is pivoted intermediate its length as by a pin 82 extending from the top plate 14. Thus, if the belt 51 tends to drive the coil 19 too fast so that slack appears in the tape portion 32 that is looped around the roller 33, the pressure of the pinch roller 57 is relaxed so that the belt 51 is engaged with the capstan 56 with a lesser frictional contact and tends to slip behind the speed of the capstan. If the tape coil 19, following such slippage, tends to rotate too slowly, then tension appears in the tape portion 32 looped around the roller 33, with the result that the pressure of the pinch roller 57 is increased and the belt 51 is driven a little faster. A spring element 83 is mounted between the arm 81 and top plate 14 in such a way as to urge the pinch roller 57 toward a pressure-relaxed direction, and to ensure relaxation of this pressure when slack appears in the tape portion 32. In operation, the pressure of the roller 57 and the speed of the belt 51 tend to establish themselves at constant values with the speed of the belt 51 precisely equal to the speed of the tape portion 32 as metered by the tape driving capstan 34. By selecting the correct spring constant for the spring 83, the tension in the tape may be established at any desired value.

It will be evident that this arrangement, in which the tape coil is driven in rotation by the endless belt 51, is superior to any arrangement in which a rotating reel is employed in that the belt 51 permits a centralized mounting of all of the tape driving and transducing elements within the area encompassed by the tape coil, and substantial savings in space and quantity of parts are realized.

The auxiliary capstan 46, which is driven by means of a belt 86 from the drum 58, is intended to ensure that the rotating coil 19 does not itself have to do the work of pulling the tape portion 32 in its circuitous path from the tape driving capstan 34 and second pinch element 36*a*. It is desirable to have the outer turn of tape on the coil 19 as loose as possible so that a condition of maximum looseness and minimum frictional contact is established for the various inner turns of the tape coil. Therefore the driving diameters of the drum 58 and capstan 46 are proportioned so that the capstan 46 tends to drive the portion 32 of tape at a velocity faster than that at which the outer turn of tape in the coil is rotating. Of course the tape portion 32 is restrained by the capstan 34 so that some slippage results at the capstan 46, but the total effect of the arrangement is to keep the tape portion 32 between the capstan 46 and capstan 34 in a tensioned condition and to ensure that all of the slack available to the tape is concentrated in the coil 19. The arrangement of the pinch device 47 is here shown as including a pair of spaced idlers 87, with an O-ring 88 looped around the idlers and engaging the tape 32 and capstan 46 with resilient pressure. Also, to ensure that the loose outer turn of tape in the coil 19 does not escape from beneath the retaining rollers 28, a series of guide brackets 89 are positioned around the outer periphery of the coil, and several guard posts 91 are similarly positioned. A series of brackets 92 are also provided to retain the inner loop of the belt 51 and the tape portion 32 at various points along their respective paths.

The pinch devices 36 and 36*a* are particularly constructed to provide resilient pinching effect instantly upon initial operation of the transport even after long periods of inactivity. It is well known that pinch rollers that are standard in the art have resilient surfaces and tend to develop a flatness or out-of-roundness if they are left in pressurized engagement with a capstan during long term inoperation of the machine. The solution usually employed in the art is to retract such pinch rollers from engagement with the capstan automatically when the machine is stopped. But such an arrangement requires special mechanism and coordinating systems to cause retraction and engagement at the proper times. To save space and to reduce operating complication in an earth-orbiting satellite, the illustrated pinch devices 36 and 36*a* are arranged to be continuously engaged with the tape and capstan and yet to avoid the defect of out-of-roundness. In particular, for example, the device 36 includes a pair of spaced idlers 93 mounted along the length of an arm 94, which in turn is pivoted as by a pin 96 extending from the top plate 14. Around the idlers 93 is looped a flexible but substantially non-resilient belt 97 that engages the tape and capstan. The ends of the two arms 94 and 94*a* that extend away from the pivot pins and beyond the capstan 34, are coupled together as by means of a tension spring 98 so that the belts 97 and 97*a* are continuously urged toward one another and against opposite sides of the capstan 34. Because the belts 97 and 97*a* are substantially non-resilient, they never stretch or develop flats, and the resilient pressure engagement provided by the spring 98 is never altered. In addition, the belts 97 and 97*a* cover a broader sector of engagement with the capstan than could possibly be covered by a cylindrical roller tangetially engaged, and the driving force is spread over a greater area of the tape. At the opposite ends of the arms 94 and 94*a* are mounted counterweights 99 and 99*a* which are adjusted to provide a balancing of the pinch device about its pivot point. Thus accelerating forces that may be applied to the transport in the plane of the coil 19 can have no effect in reducing or increasing the pinch pressure of the device.

Thus, there has been described a tape transport making use of an endless tape coil mounted for frictionless rotation and driven by a belt engaging the inner periphery of the coil, the speed of the belt being regulated to precisely equal the speed of the tape withdrawn from the inner side of the coil by a tape metering capstan.

What is claimed is:

1. A transport for an endless tape coil, comprising:
means for guiding tape from one periphery of said coil and out of the plane of said coil to the other periphery of said coil;
transducing means for said tape mounted on the path of said tape between said peripheries of said coil;
means engaging the inner periphery of said coil for causing relative rotational movement between said guiding means and coil whereby said tape is fed to said guiding means from said one periphery of said coil and through said guiding means to said transducing means and to said other periphery of said coil;
capstan means associated with said guiding means for metering the tape passing therethrough, said capstan means engaging said tape at least between said one coil periphery and said transducing means, said capstan means also engaging said third-named means, and being responsive to the tension of said tape between said one coil periphery and said transducing means to regulate the movement of said third-named means whereby said tape is fed from said coil to said capstan means at the metering rate, and said relative rotational movement of said coil and said second-named means is effected without undue strain on the length of tape extending between said coil and said captsan means; and
auxiliary capstan means driven by said third-named means and engaging said tape for pulling said tape from said capstan means in the direction of said other periphery of said coil, whereby the tension of tape within said coil is maintained at a minimum value.

2. A transport for an endless tape coil, comprising:
means for guiding tape from one periphery of said coil and out of the plane of said coil to the other periphery of said coil;
transducing means for said tape mounted on the path of said tape between said peripheries of said coil;
means engaging the inner periphery of said coil for causing relative rotational movement between said guiding means and coil whereby said tape is fed to said guiding means from said one periphery of said coil and through said guiding means to said transducing means and to said other periphery of said coil;
capstan means associated with said guiding means for metering the tape passing therethrough, said capstan means engaging said tape at least between said one coil periphery and said transducing means, said capstan means also engaging said third-named means, whereby said tape is fed from said coil to said capstan means at the metering rate, and said relative rotational movement of said coil and said second-named means is effected without undue strain on the length of tape extending between said coil and said capstan means; and
auxiliary capstan means driven by said third-named means and engaging said tape for pulling said tape from said capstan means in the direction of said other periphery of said coil, whereby the tension of tape within said coil is maintained at a minimum value.

3. A transport for an endless tape coil, comprising:
means for guiding tape from the inner periphery of said coil and out of the plane of said coil to the outer periphery of said coil;
transducing means for said tape mounted on the path of said tape between said peripheries of said coil;
an endless belt having an outer loop engaging the inner periphery of said coil for causing relative rotational movement of said coil with respect to said guiding means;
said endless belt also having a re-entrant inner loop surrounding said transducing means and portions of said guiding means;
means engaging said belt for causing lengthwise movement of said belt, said means also engaging said tape between said inner periphery and said transducing means, and being responsive to the tension of said tape between said one coil periphery and said transducing means to regulate the movement of said belt, whereby said tape is fed to said guiding means from said inner periphery of said coil and through said guiding means to said transducing means and to said outer periphery of said coil; and
auxiliary capstan means driven by said belt and engaging said tape for pulling said tape from said capstan means in the direction of said other periphery of said coil, whereby the tension of tape within said coil is maintained at a minimum value.

4. A transport for an endless tape coil, comprising:
anchored anti-friction bearing means for mounting said coil for rotation about a central zone, said means being arranged to support said coil at the inner periphery and upon at least one side thereof, said means being arranged to surround said central zone and to present at least one gap in the circumference thereof for passage of tape from said coil to said central zone;
an endless belt having an outer loop disposed between said bearing means and said coil for driving said coil in rotation;
said endless drive belt having a re-entrant inner loop extending inwardly from said outer loop and through said gap, said inner loop being arranged to surround said central zone within the circumference defined by said bearing means;
guiding and tensioning means for said inner loop of said endless drive belt;

a rotating capstan for said inner loop of said endless drive belt;

a pivotable arm mounted in said central zone, a pinch roller mounted on one end of said arm for pivoting engagement and disengagement with said belt capstan, said arm being springloaded toward a disengaged position of said roller and capstan, and a tape-engaging idler mounted on the other end of said arm;

said belt being looped substantially around said capstan and between said capstan and roller and thence reversely substantially around said roller for sliding non-driven low-friction engagement with said capstan in the disengaged position of said roller and for tensioned high-friction driven engagement with said capstan when said roller is engaged with said capstan;

closed-loop driving capstan means for said tape, mounted within said central zone;

drive means for said belt capstan and tape capstan means and for driving said tape capstan means at a substantially slower peripheral speed than said belt capstan;

transducing means for said tape mounted within said central zone;

guide means arranged to conduct said tape first from the inner periphery of said coil and inwardly through said gap defined by said bearing means and through the corresponding neck between the outer and inner loops of said drive belt, thence in a tensioned loop around said idler at the end of said arm, said loop being arranged so that increase of tension in said tape causes increased engagement of said belt roller with said belt capstan and increase of driving force on said belt, thence to said tape capstan means, thence in a closed loop around said transducers and back to said tape capstan means, thence out of the plane of said coil and across said coil to the outer periphery of said coil for return thereto;

said belt inner loop guide means including a rotating member driven by said belt;

auxiliary slipping capstan means mounted outside the outer periphery of said coil and engaging said tape returning to the outer periphery of said coil; and means coupling said belt driven member and said auxiliary capstan means so that said auxiliary capstan is driven at a peripheral speed substantially greater than the longitudinal velocity of said belt, whereby said tape is tensioned in its path from said tape capstan means and is returned to the outer periphery of said coil in such a way that slack exists in the tape only in the outer turns of said coil, and the tension in said coil is maintained at the lowest possible value.

5. In a tape transport, the combination comprising:

a rotating capstan drum;

a pair of substantially parallel arms mounted on opposite sides of said capstan drum and arranged to pivot about axes that are parallel to the axis of said drum;

a pair of idler pulleys mounted in spaced relation along the length of each of said arms, in axial parallelism with and upon opposite sides of said capstan drum;

a flexible but substantially non-resilient capstan belt stretched around each of said pairs of idler pulleys and engaging opposite portions of the periphery of said capstan drum;

resilient means coupled to both of said arms for urging said capstan belts toward one another and into pinching pressure engagement with said opposite peripheral portions of said capstan drum; and counterweight means on each arm for balancing the corresponding assembly of arm, pulleys and belt about the corresponding arm pivot axis.

References Cited by the Examiner

UNITED STATES PATENTS

| | | | |
|---|---|---|---|
| Re. 19,198 | 6/1934 | Jimenez et al. | |
| 1,825,439 | 9/1931 | Cawley | 226—183 |
| 2,031,079 | 2/1936 | Streyckmans | 242—55.19 X |
| 2,037,601 | 4/1936 | Shirlow et al. | 242—55.19 X |
| 2,288,983 | 7/1942 | Weiss | 88—18.7 X |
| 2,630,618 | 3/1953 | Sewell | 226—177 X |
| 2,670,907 | 3/1954 | Huck. | |
| 2,918,536 | 12/1959 | Appert et al. | 242—55.19 X |
| 3,150,841 | 9/1964 | Stevens | 242—55.19 |

FOREIGN PATENTS

| | | |
|---|---|---|
| 895,325 | 1/1945 | France. |
| 18,684 | 1912 | Great Britain. |
| 217,275 | 6/1924 | Great Britain. |
| 414,206 | 7/1946 | Italy. |
| 352,505 | 4/1961 | Switzerland. |

MERVIN STEIN, *Primary Examiner.*

JOSEPH P. STRIZAK, RUSSEL C. MADER, *Examiners.*

B. S. TAYLOR, *Assistant Examiner.*